United States Patent [19]
Morris

[11] 4,168,074
[45] Sep. 18, 1979

[54] APPARATUS FOR MOVING CARAVANS AND OTHER TRAILED VEHICLES

[76] Inventor: Lionel G. Morris, 17 Ferguson Ave., Myrtle Bank, South Australia, Australia 5064

[21] Appl. No.: 808,565

[22] Filed: Jun. 21, 1977

[30] Foreign Application Priority Data

Jun. 21, 1976 [AU] Australia ............................... PC6346
Dec. 15, 1976 [AU] Australia ............................... PC8500

[51] Int. Cl.² ............................................. B60K 9/00
[52] U.S. Cl. .......................................................... 280/3
[58] Field of Search ..................... 280/3, 151, 46, 476, 280/475; 180/14 C, 14 R

[56] References Cited
U.S. PATENT DOCUMENTS

3,183,013  5/1965  Brown ..................................... 280/3

FOREIGN PATENT DOCUMENTS

1296605  5/1962  France ............................................ 280/3

*Primary Examiner*—John A. Pekar
*Attorney, Agent, or Firm*—Oldham, Oldham, Hudak & Weber Co.

[57] ABSTRACT

Apparatus for assisting moving of trailed vehicles such as caravans including a jockey wheel supported by an extendible stem adapted to be secured to a forward draft frame of a vehicle, the apparatus being characterized according to this invention in that there is a lever arm secured relative to the jockey wheel in such a way as to control the rotational direction of the jockey wheel and an interengaging gear assembly including a drive shaft with the lever arm arranged so that rotation of the drive shaft will effect rotation of the jockey wheel about its central axis to effect the moving of the trailed vehicle when attached thereto.

4 Claims, 4 Drawing Figures

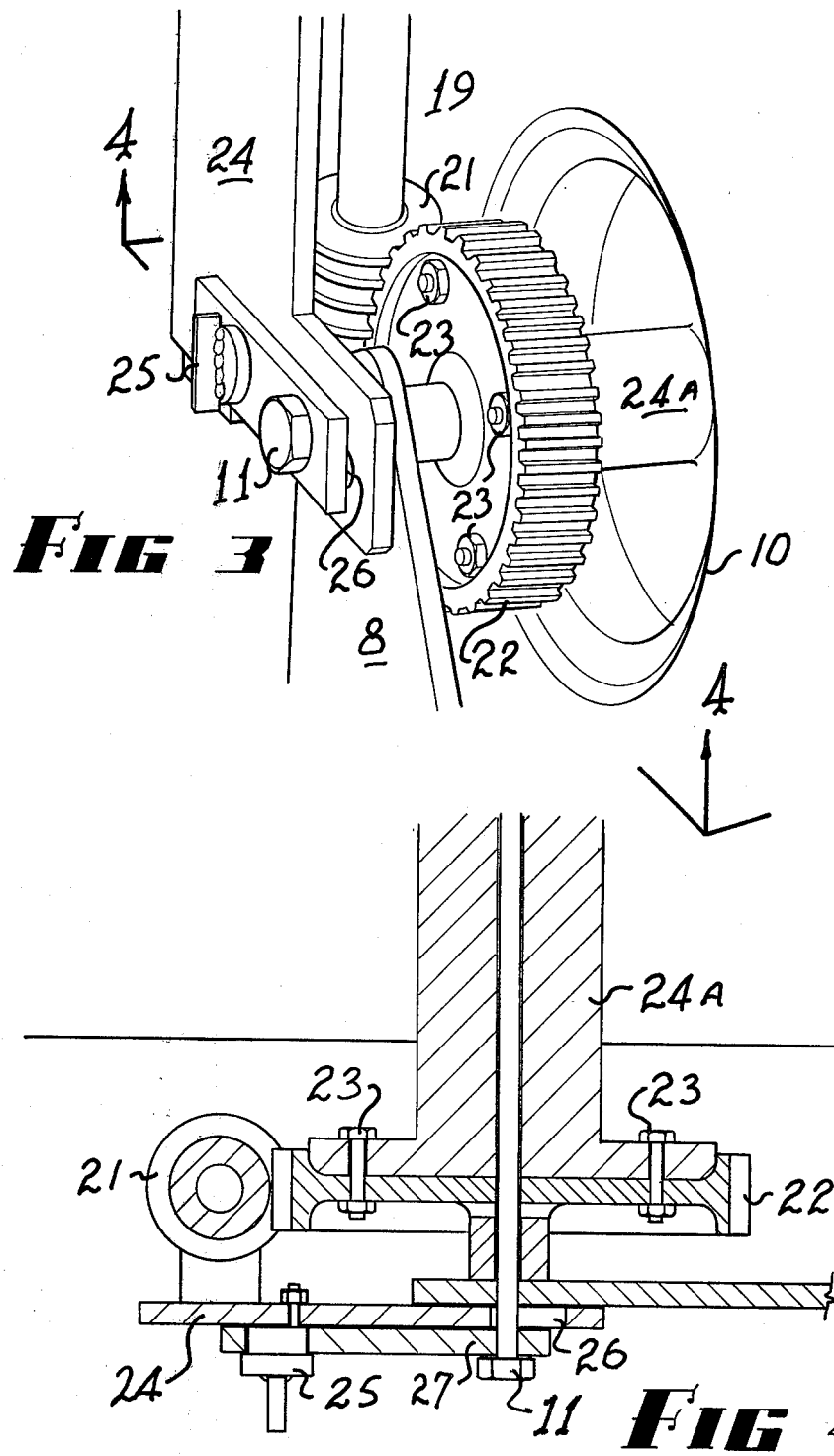

APPARATUS FOR MOVING CARAVANS AND OTHER TRAILED VEHICLES

This invention relates to apparatus for assisting moving of trailed vehicles.

One preferred application to which this invention relates is to the moving of caravans where these are disconnected from the towing vehicle and it is necessary to move these by hand separate from the towing vehicle.

The invention however relating as it does to apparatus which can assist the moving of any trailed vehicle is not limited to the application of caravans and could be used for other trailed vehicles such as boat trailers, horse floats, or otherwise.

One problem to which this invention generally relates is the difficulty at the present time of manually shifting some caravans when these are separated from the towing vehicle.

On occasions, it is desirable to move a caravan manually, for instance to locate the caravan in a storage position in which it would not normally be able to be stored with an attached towing vehicle. On other occasions, the location of the towing vehicle relative to the trailed vehicle for interconnection of these is normally a job that will require two persons, a first to drive the towing vehicle and the second to indicate the relationship between the two.

Where there is only one person, it is very difficult to establish a close relationship and once again this is a problem to which this invention is directed.

It will be understood that where a caravan is to be manually shifted this can require substantial effort and this is particularly the case if the caravan has to be moved across soft dirt or sand or where a caravan has to be moved up an incline.

Indeed many people are unable to use or travel with caravans simply because of the fact that they are physically unable to manually shift a caravan for the several purposes either perhaps because of age or other disabilities and this therefore is a further problem to which this invention is directed.

The invention can be said to reside in an apparatus for assisting moving of trailed vehicles such as caravans the apparatus including a jockey wheel supported by an extendible stem adapted to be secured to a forward draft frame of the vehicle, the apparatus being characterised according to this invention in that there is a lever arm secured relative to the jockey wheel in such a way as to control the rotational direction of the jockey wheel, and an interengaging gear assembly including a drive shaft with the lever arm arranged so that rotation of the drive shaft will effect rotation of the jockey wheel about its central axis to effect the moving of the trailing vehicle.

There are two features to note in relation to this first statement of the invention.

Firstly, there is a lever arm which controls the rotational direction of the jockey wheel recalling of course that a jockey wheel with a castor and this being supported by an extendible stem is common to the art, the lever arm then controlling the direction of the castor of the jockey wheel.

Secondly, there is a drive shaft which acts through interengaging gears so as to enable rotation of the jockey wheel and this therefore provides for manual rotation of the drive shaft which, because of the judicious selection of gear ratios, can obtain high mechanical advantage and therefore turn the jockey wheel with little force necessary on the drive shaft.

This can mean that with very little effort both the direction of the jockey wheel can be determined and the rotation can be effected by people with even minimal amount of force.

According to a further preferred aspect of the invention, there is proposed that the lever arm is pivotally secured relative to the jockey wheel about a substantially horizontal axis as determined when the jockey wheel is in a clamped position to a trailed vehicle.

According to a further preferred feature there is proposed that the pivot axis of the lever arm co-incides with that of the jockey wheel.

A further preferred feature includes the fact that a gear wheel is secured to the jockey wheel, and coaxially with this gear wheel, and a worm gear is secured at or toward the end of the shaft in interengaging reaction with the gear wheel.

According to a further form of the invention, this can be said to reside in apparatus for assisting moving of trailed vehicles such as caravans comprising a stem with a low extendible portion with a yoke secured thereto, the stem being adapted to be secured by clamping of an upper portion to the forward draft frame of the vehicle to be trailed, the direction of elongation of the stem being substantially verticle, a ground engageable jockey wheel pivotally supported by the yoke, the yoke being pivotally supported by the stem to enable the yoke to rotate with a castor action about a substantially vertical axis when the stem is secured to the said draft frame, a gear wheel secured coaxially with the jockey wheel, a lever arm pivotally secured to the yoke the axis being the axis of rotation of the jockey wheel, and a worm gear positioned to mesh with the gear wheel supported to at or toward the end of a rotatable shaft which shaft is supported by a said lever arm, the shaft having at its other end a crank to enable manual rotation of the worm gear and hence by rotation of the gear wheel the jockey wheel to effect moving of a trailed vehicle.

According to a further feature, the lever arm includes at its end a joke one set of which is secured by adjustable means with a first said yoke as referred to in the previous paragraph, the adjustment including two positions, in one position the leg being located with its supporting pivot connection coaxial with the jockey wheel axis, and the worm wheel in an engaging and driving position with a gear wheel, and in a second position a leg being located with its position not coaxial with the jockey wheel axis, and the worm wheel is in a disengaged position with respect to the drive wheel.

The invention will be better understood with reference to a preferred embodiment which shall now be described with the assistance of drawings which are attached hereto and in which:

FIG. 3 is an enlarged detailed perspective view showing the interengaging position of the several gear wheels, and FIG. 4 is a cross-sectional view through the arrangement as shown in FIG. 3 along the lines 4—4.

Figure 1:
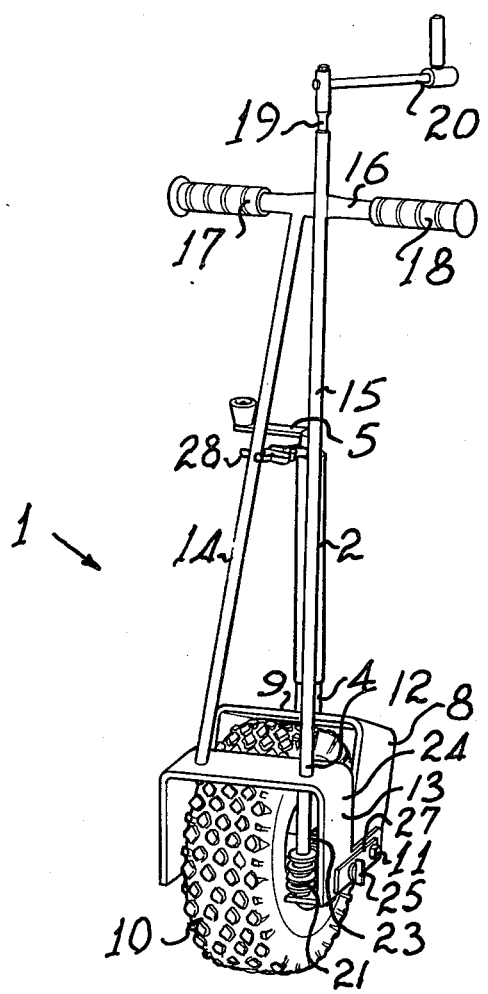
FIG. 1 shows a perspective view of the preferred embodiment.

The drawings will now be referred to in detail.

The apparatus 1 includes an extendible stem 2 including an upper fixed portion 3 and a lower extendible portion 4 the relative extension being governed by the position of control arm 5. The stem 2 is adapted to be secured as is shown in FIG. 2 to the forward draft frame 6 of a trailed vehicle which is not shown, by means of clamp device 7.

At the lower end of the stem 2 is a yoke 8, the extendible portion 4 being secured in fixed manner to the bridge 9 of the yoke 8.

Figure 2:
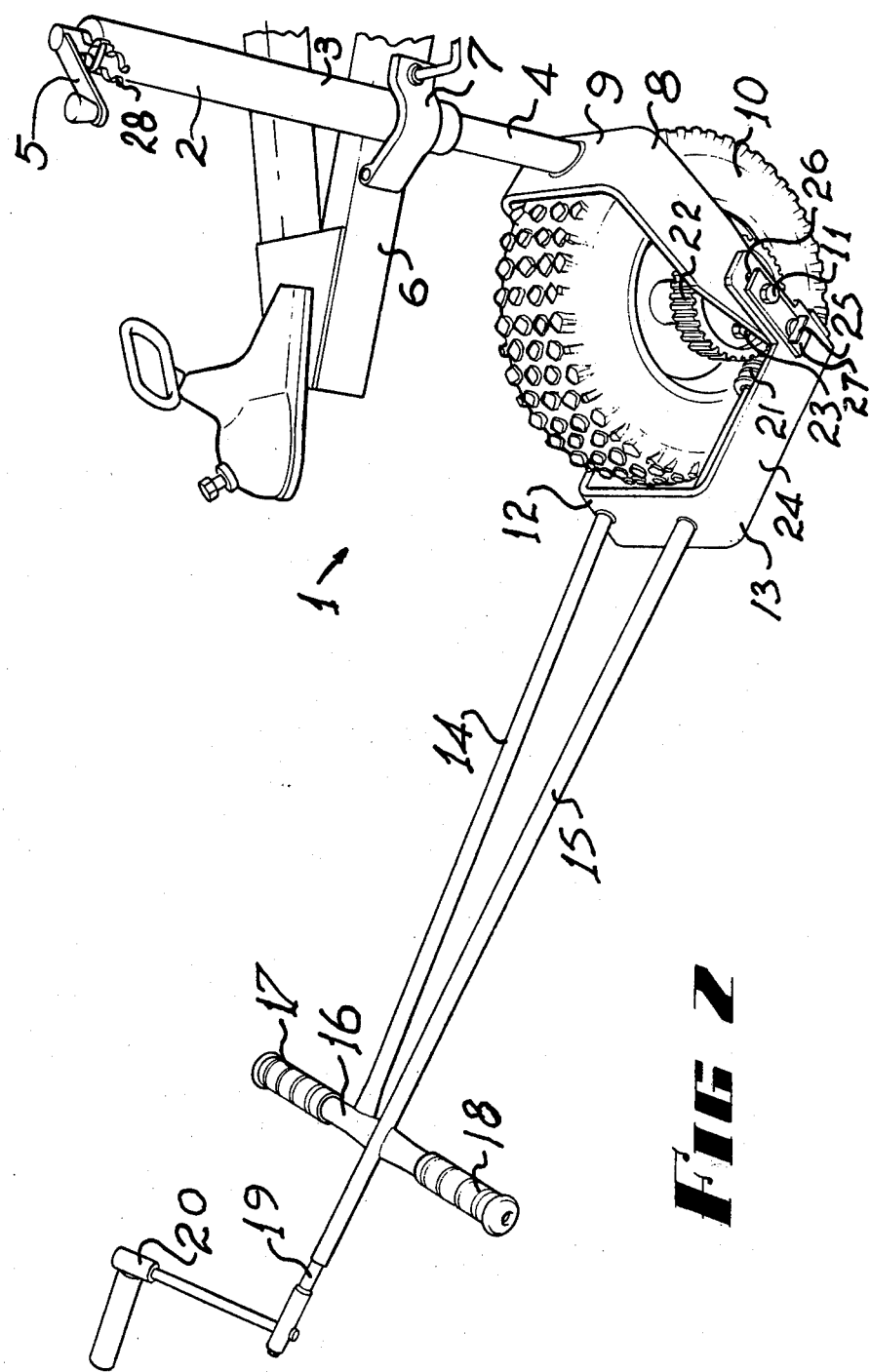
FIG. 2 shows the apparatus in an attached position to a forward draft frame of a trailed vehicle.

The extendible stem portion 4 is rotatable relative to the fixed portion 3 so that in a position as shown in FIG. 2 the yoke 8 will generally rotate about a vertical axis as defined by the relative positions of the extendible portion of the stem 4 relative to the fixed portion of the stem 3.

This will normally be a vertical axis or substantially vertical.

A jockey wheel 10 is supported by the yoke 8 in a manner that will allow this jockey wheel then to castor in conventional manner if this is desired.

The jockey wheel 10 is supported in its position around its rotational axis by means of axle 11 which is removable if desired.

Perhaps more importantly however, there is also secured to the yoke 8 a lever arm 12 which includes at its end a yoke 13 the yoke being pivotally secured to the yoke 8 about the axis therefor of the axis of rotation of the jockey wheel 10.

The lever arm 12 includes two arms 14 and 15 at an outer end of which is a transverse handle member 16 including two handles 17 and 18 and at the further end of the arm 15 is an extension of drive shaft 19 at the end of which is secured a crank handle 20 by which the rotation of the drive shaft 19 can be effected. The drive shaft 19 fits within the hollow of the arm 15 and at its inner end terminates in a worm wheel 21.

Accordingly by rotation of the crank 20 the worm 21 can be rotated.

Secured coaxially with the jockey wheel 10 is a gear wheel 22 the attachment being by reason of bolts 23 to an extension 24 A of the rim and the position of this gear wheel is such that there is an interengaging relationship with the worm 21.

The position of the worm gear 21 however is governed by the relative position of the arm 24 of the yoke 13 relative to the position of the yoke 8 and this is governed by control lever 25. The control lever 25 is a cam which by rotation will cause relative positioning movement between the two legs of the yokes 8 and 13 and this will in turn cause the worm wheel to either take a non-engaging position relative to the gear wheel 22 or in a second position an interengaging position.

The operation of this cam is probably best seen in FIG. 4 where there will also be seen an elongated slot 26 which allows the relative movement of leg 24 relative to the axial shaft 11.

The other side of the yoke 13 is simply a pivot connection to the shaft 11 and there is of course in practice sufficient slack between the connections to allow for this very small relative movement between the leg 24 and the yoke 8.

In operation then, the rotational direction of the jockey wheel 10 is governed by someone controlling the position of the lever arm 12 and because of the length of this lever arm, this is very easy and furthermore rotation of the jockey wheel is merely controlled by rotation of the crank 20.

The cam control lever 25 is connected to the axle 11 by reason of connecting plate 27.

To assist the holding of the lever arm in a storage position when not being used is provided a spring clip 28 having two spring clip ends one of which is adapted to engage around the shank of the control arm 25 and the other end adapted to engage around one of the arms either 14 or 15.

If it is desired at any time to allow the caravan to move under its own inertia without any limitation of the drive coupling, it is then an easy matter to rotate the lever 25 so as to effect a non-interengaging position between the worm and the gear wheel and in this instance then the jockey wheel acts in a normal manner as a castoring jockey wheel except that the lever arm can still be used to guide the direction of the jockey wheel if this is desired.

Furthermore, obviously the lever arm can be readily removed from the yoke 8 simply by removing the shaft 11 removing the lever arm and relocating the shaft 8 and the jockey wheel will then act in a perfectly ordinary manner as a castoring jockey will.

It will be seen then that with the preferred embodiment there is now available a very easy means by which even a most heavy trailed vehicle can be readily controlled by even a reasonably weak person and a substantial amount of the effort otherwise necessary is now avoided.

Substantial advantage also rests in the particular arrangement of the members including a locating of the interengaging or non-interengaging position of the relative gear members.

I claim:

1. Apparatus for assisting moving of trailed vehicles such as caravans comprising a stem with a lower extendible portion with a yoke secured thereto, the stem being adapted to be secured by clamping of an upper portion of said stem to a forward draft frame of a vehicle to be trailed with its direction of elongation substantially vertical, a ground engageable jockey wheel pivotally supported by the yoke, the yoke being pivotally supported by this stem to enable steering about a substantially vertical axis when the stem is secured to the said draft frame, a gear wheel secured coaxially with the jockey wheel, a lever arm secured to the yoke, a worm gear positioned to mesh with the gear wheel supported on a rotatable shaft, which shaft is supported by said lever arm and adapted to be rotated to enable manual rotation of the worm gear and hence, by rotation of the gear wheel, the jockey wheel to effect moving of a trailed vehicle wherein the secured lever arm includes at its end a second yoke, one leg of which is secured by adjustable means to the first said yoke, said adjustable means having two positions, in one position the leg being located with the supporting pivot connection coaxial with the jockey wheel axis and the worm gear in an engaging and driving position with the gear wheel, and in a second position the leg being located with its pivotal position not coaxial with the jockey wheel axis, and the worm gear is in a disengaged position with respect to the drive wheel.

2. Apparatus for assisting moving of trailed vehicles as in claim 1 further characterized in that the lever arm is pivotally secured to the said first yoke, the pivotal axis of the lever arm being concentric with the axis of rotation of the jockey wheel.

3. Apparatus for assisting moving of trailed vehicles as in claim 1 wherein said shaft has at its end opposite to the worm wheel a crank handle.

4. Apparatus for assisting moving of trailed vehicles as in claim 1 further characterized by said adjustable means including a cam control lever operatively connecting said second yoke to said first yoke to move said worm gear into and out of engagement with said worm wheel.

* * * * *